(12) United States Patent
Diesing et al.

(10) Patent No.: US 10,911,366 B2
(45) Date of Patent: Feb. 2, 2021

(54) TECHNOLOGIES FOR BALANCING THROUGHPUT ACROSS INPUT PORTS OF A MULTI-STAGE NETWORK SWITCH

(71) Applicant: Intel Corporation, Santa Clara, CA (US)

(72) Inventors: Scott S. Diesing, Round Rock, TX (US); Michael A. Parker, Santa Clara, CA (US); Albert S. Cheng, Bellevue, WA (US); Nan Ni, Austin, TX (US)

(73) Assignee: Intel Corporation, Santa Clara, CA (US)

(*) Notice: Subject to any disclaimer, the term of this patent is extended or adjusted under 35 U.S.C. 154(b) by 689 days.

(21) Appl. No.: 15/639,816

(22) Filed: Jun. 30, 2017

(65) Prior Publication Data

US 2019/0007319 A1    Jan. 3, 2019

(51) Int. Cl.
*H04L 12/54* (2013.01)
*H04L 12/70* (2013.01)
*H04L 12/773* (2013.01)
*H04L 12/803* (2013.01)
*H04L 12/863* (2013.01)
*H04L 12/867* (2013.01)
*H04L 12/869* (2013.01)
*H04L 12/933* (2013.01)
*H04L 12/935* (2013.01)

(52) U.S. Cl.
CPC .............. *H04L 47/60* (2013.01); *H04L 12/56* (2013.01); *H04L 45/60* (2013.01); *H04L 47/125* (2013.01); *H04L 47/625* (2013.01); *H04L 47/629* (2013.01); *H04L 49/10* (2013.01); *H04L 49/15* (2013.01); *H04L 49/30* (2013.01); *H04L 2012/568* (2013.01); *H04L 2012/5678* (2013.01); *H04L 2012/5679* (2013.01); *H04L 2012/5681* (2013.01); *H04L 2012/5684* (2013.01)

(58) Field of Classification Search
CPC . H04L 12/54–5601; H04L 12/64–6402; H04L 2012/5678–5684; H04L 2012/6405–6416; H04L 45/60; H04L 47/10; H04L 47/12–127; H04L 47/50–6295; H04L 49/10–9094
See application file for complete search history.

(56) References Cited

U.S. PATENT DOCUMENTS

| 2003/0043813 A1* | 3/2003 | Van Wageningen | H04L 47/10 370/395.4 |
| 2003/0072326 A1* | 4/2003 | Alasti | H04L 47/50 370/462 |
| 2014/0025817 A1* | 1/2014 | Lau | H04L 49/254 709/225 |

* cited by examiner

*Primary Examiner* — Timothy J Weidner
(74) *Attorney, Agent, or Firm* — Compass IP Law PC

(57) ABSTRACT

Technologies for balancing throughput across input ports include a network switch. The network switch is to generate, for an arbiter unit in a first stage of a hierarchy of stages of arbiter units, turn data indicative of a set of turns in which to transfer packet data from devices connected to input ports of the arbiter unit. The network switch is also to transfer, with the arbiter unit, the packet data from the devices in the set of turns. Additionally, the network switch is to determine weight data indicative of the number of turns represented in the set and provide the weight data from the arbiter unit in the first stage to another arbiter unit in a subsequent stage to cause the arbiter unit in the subsequent stage to allocate a number of turns for the transfer of the packet data from the arbiter unit in the first stage.

28 Claims, 7 Drawing Sheets

US 10,911,366 B2

TECHNOLOGIES FOR BALANCING THROUGHPUT ACROSS INPUT PORTS OF A MULTI-STAGE NETWORK SWITCH

BACKGROUND

Typical architectures for high-radix network switches spread the process of switching data packets across multiple stages of sub-switches, referred to sometimes as arbiter units. Such architectures may lead to unfairness between different input ports competing for the same resource (e.g., an output port of the network switch). For example, each arbiter unit in a first stage of the network switch may implement a round-robin scheme to give a turn (e.g., a time period in which to send a packet) to each input port to which a compute device is connected. However, if the number of compute devices is not evenly distributed across the input ports of the arbiter units in the first stage, then in the second stage, an arbiter unit that performs a round-robin scheme will unfairly apportion the turns for transferring packets from the previous stage, giving comparably more throughput to compute devices connected the arbiter unit in the previous stage having the least amount of connected compute devices and comparably less throughput to compute devices connected to other arbiter units in the previous stage.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
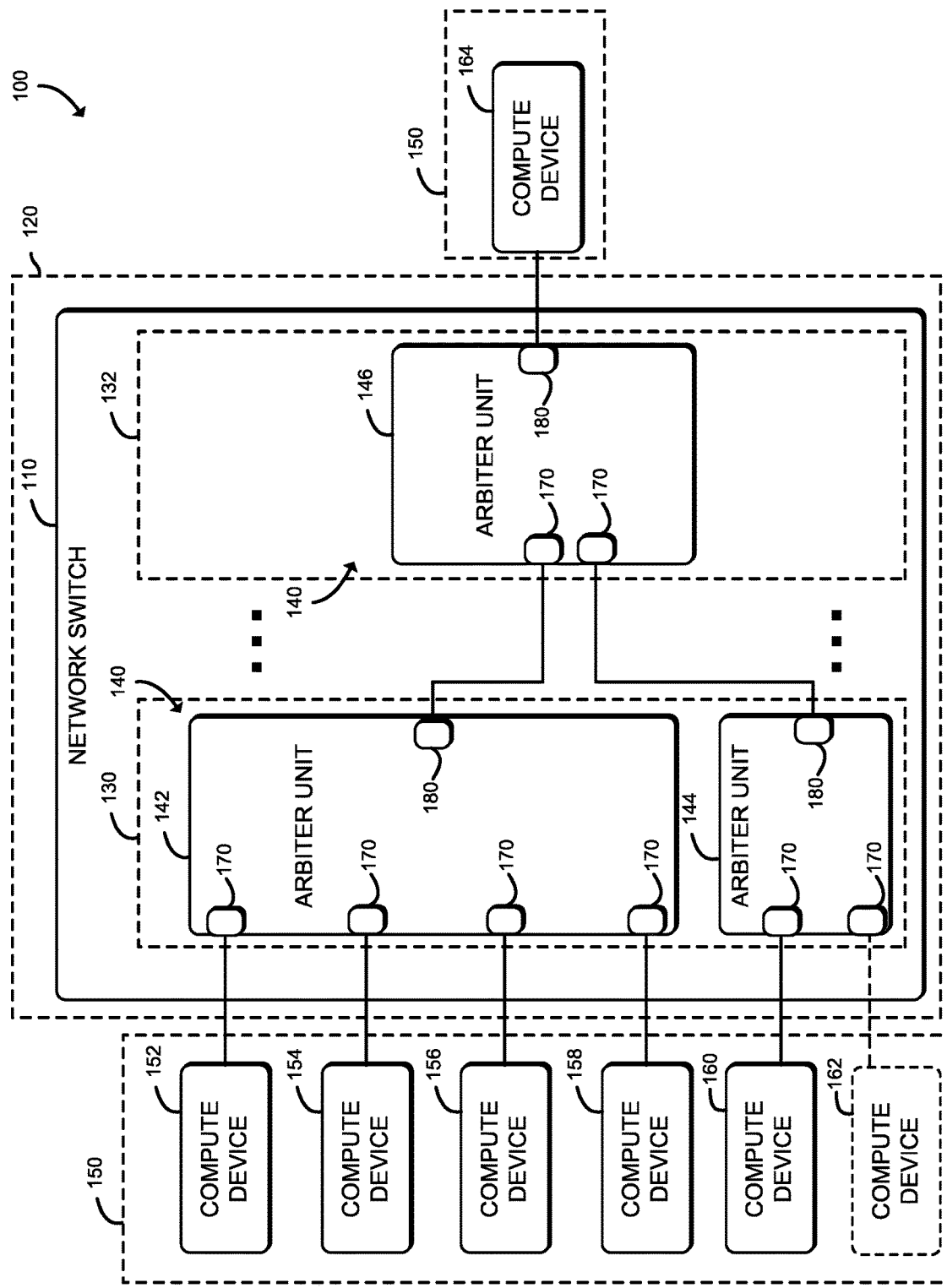
FIG. 1 is a simplified block diagram of at least one embodiment of a system for balancing throughput across input ports of a multi-stage network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 100 for balancing throughput across input ports of a multi-stage switch 110 includes the multi-stage network switch 110 in communication with multiple compute devices 150 in a network 120. The network switch 110 includes multiple stages 130, 132, and each stage 130, 132 includes one or more arbiter units 140. In the illustrative embodiment, the first stage 130 includes arbiter units 142, 144 and the second stage 132 includes arbiter unit 146. In other embodiments, the number of arbiter units 140 in each stage 130, 132 may differ from the illustrated embodiment, and the number of stages 130, 132 may be greater than two. However, in general, the stages 130, 132 form a hierarchy in which the number of arbiter units 140 in each subsequent stage (e.g., moving from an input side of the network switch 110 to an output side of the network switch 110) decreases. In operation, each compute device 152, 154, 156, 158, 160 transmits data packets to a corresponding input port 170 of a corresponding arbiter unit 140. Another compute device 162 is idle (e.g., not actively transmitting packets to the network switch 110).

Each arbiter unit 140 sequentially transfers the data packets, such as in a round-robin scheme in which each input port 170 to which a compute device 150 is connected receives a turn (e.g., a slot in a stream of packet data). Each arbiter unit 140 additionally sends weight data indicative of the number of input ports 170 to which compute devices 150 are connected (e.g., actively sending packets) to the arbiter unit 146 in the subsequent stage 132. The arbiter unit 146 then performs a modified round-robin scheme in which the number of turns allocated to each input port 170 corresponds to the weight data received from the arbiter units 140 in the previous stage (e.g., the arbiter units 142, 144 of the stage 130). Accordingly, when the compute devices 152, 154, 156, 158 are actively transmitting packets to the arbiter unit 142 and only compute device 160 is actively transmitting packets to arbiter unit 144 (e.g., with compute device 162 temporarily idle), rather than providing 50% of the total throughput (e.g., total number of turns) to the four compute devices 152, 154, 156, 158 and the other 50% of the throughput to the compute device 160, the arbiter unit 146 may instead allocate 80% of the throughput (e.g., four out of every five turns) to the stream of packets coming from the arbiter unit 142 and 20% (e.g., one out of every five turns) to the stream of packets coming from the arbiter unit 144. As a result, the data packets from the various compute devices 152, 154, 156, 158, 160 are fairly represented in an output data stream sent by the network switch 110 through an output port 180 of arbiter stage 132 to a target compute device 164 on the output side of the network switch 110.

Figure 2:
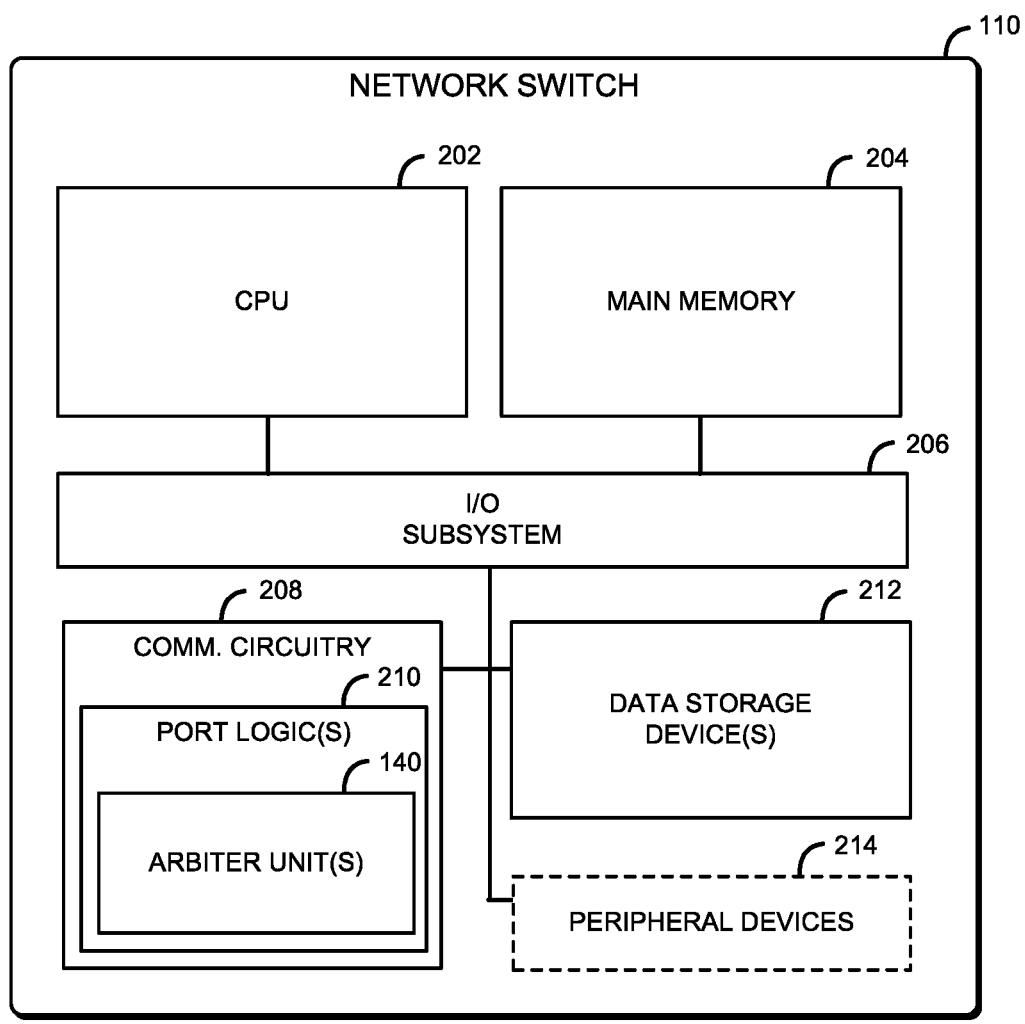
FIG. 2 is a simplified block diagram of at least one embodiment of the network switch of the system of FIG. 2.

Referring now to FIG. 2, the network switch 110 may be embodied as any type of device capable of performing the functions described herein, including transferring data packets from compute devices 150 with multiple arbiter units 140, and sharing weight data indicative of the number of compute devices 150 sending data packets to each input port 170 of each arbiter unit 140 to one or more other arbiter units 140 in subsequent stages to balance throughput across all of the input ports 170. For example, in some embodiments, the network switch 110 may be embodied as computer, a multiprocessor system, or a network appliance.

As shown in FIG. 2, the illustrative network switch 110 includes a central processing unit (CPU) 202, a main memory 204, an input/output (I/O) subsystem 206, communication circuitry 208, and one or more data storage devices 212. Of course, in other embodiments, the network switch 110 may include other or additional components, such as those commonly found in a computer (e.g., peripheral devices, a display, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor or processors capable of performing the functions described herein. As such, the CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. The main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as packet data, weight data, turn data, operating systems, applications, programs, libraries, and drivers.

The I/O subsystem 206 may be embodied as any circuitry and/or components capable of facilitating input/output operations with the CPU 202, the main memory 204, and other components of the network switch 110. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the network switch 110, on a single integrated circuit chip.

The communication circuitry 208 may be embodied as any communication circuit, device, or collection thereof, capable of enabling communications over the network 120 between the network switch 110 and another device (e.g., one or more of the compute devices 150). The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes one or more port logics 210, each of which may also be referred to as a network interface controller (NIC). The communication circuitry 208 may be located on silicon separate from the CPU 202, or the communication circuitry 208 may be included in a multi-chip package with the CPU 202, or even on the same die as the CPU 202. The one or more port logics 210 may be embodied as one or more add-in-boards, daughtercards, network interface cards, controller chips, chipsets, specialized components such as a field programmable gate array (FPGA) or application specific integrated circuit (ASIC), or other devices that may be used by the network switch 110 to connect with another device (e.g., a compute device 150). In some embodiments, one or more port logics 210 may be embodied as part of a system-on-a-chip (SoC) that includes one or more processors, or included on a multichip package that also contains one or more processors. In some embodiments, the one or more port logics 210 may include a local processor (not shown) and/or a local memory (not shown) that are both local to the port logic(s) 210. In such embodiments, the local processor of the port logic(s) 210 may be capable of performing one or more of the functions of the CPU 202 described herein. Additionally or alternatively, in such embodiments, the local memory of the port logic(s) 210 may be integrated into one or more components of the network switch 110 at the board level, socket level, chip level, and/or other levels. In the illustrative embodiment, the port logic(s) 210 include the arbiter units 140 described above, which may be embodied as any device or circuitry capable of determining weights to be assigned to each of one or more input ports 170 of each arbiter unit 140, determining a number of turns to allocated to each of the input ports 170 for transferring data packets in a sequence, providing the weights (e.g., as weight data) to one or more arbiter units 140 in a subsequent stage of the network switch 110, and sending the data packets through an output port 180 to another device (e.g., to another arbiter unit 140, a compute device 150, or other device).

The one or more illustrative data storage devices 212, may be embodied as any type of devices configured for short-term or long-term storage of data such as, for example, memory devices and circuits, memory cards, hard disk drives, solid-state drives, or other data storage devices. Each data storage device 212 may include a system partition that stores data and firmware code for the data storage device 212. Each data storage device 212 may also include an operating system partition that stores data files and executables for an operating system. Additionally, the network switch 110 may include one or more peripheral devices 214. Such peripheral devices 214 may include any type of peripheral device commonly found in a compute device such as a display, speakers, a mouse, a keyboard, and/or other input/output devices, interface devices, and/or other peripheral devices.

The compute devices 150 may have components similar to those described in FIG. 2. As such, the description of those components of the network switch 110 is equally applicable to the description of components of the compute devices 150 and is not repeated herein for clarity of the description. It should be appreciated the compute devices 150 may include other components, sub-components, and devices commonly found in a computing device, which are not discussed above in reference to the network switch 110 and not discussed herein for clarity of the description.

As described above, the network switch 110 and the compute devices 150 are illustratively in communication via the network 120, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
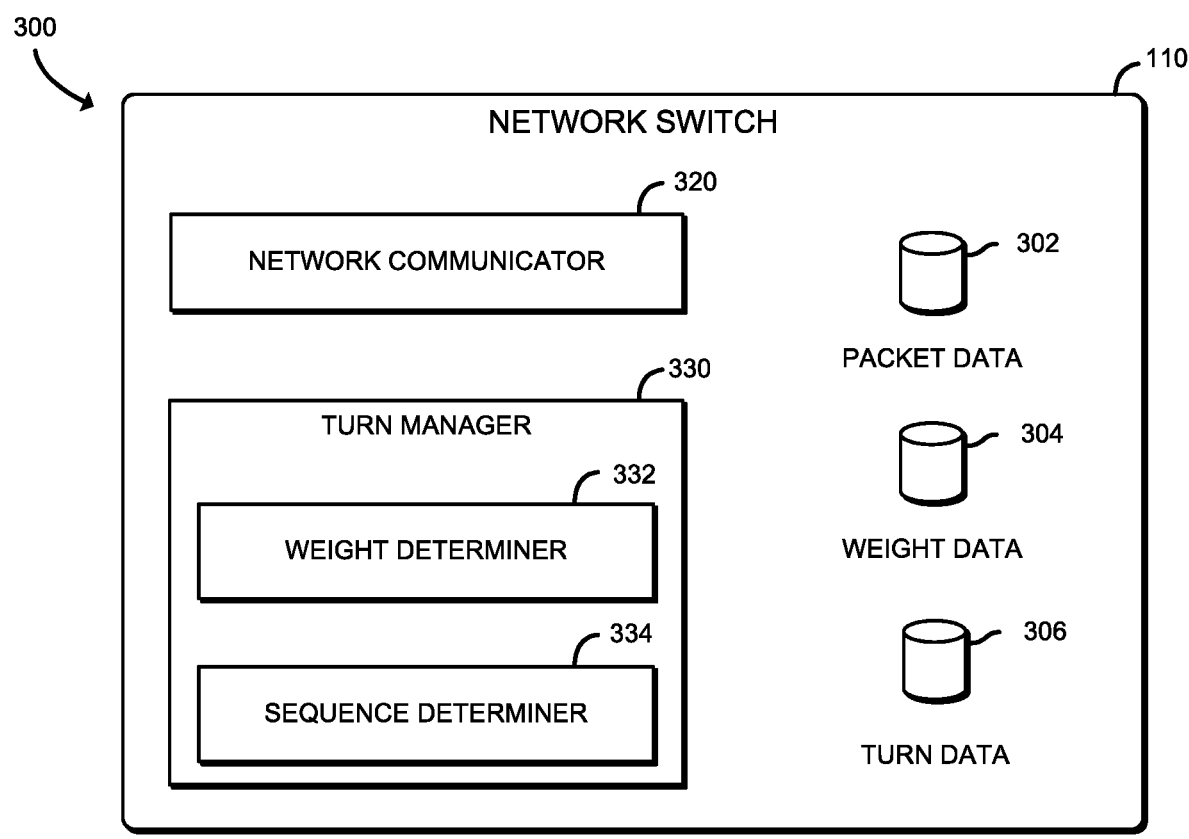
FIG. 3 is a simplified block diagram of at least one embodiment of an environment that may be established by the network switch of FIGS. 1 and 2.

Referring now to FIG. 3, in the illustrative embodiment, the network switch 110 may establish an environment 300 during operation. The illustrative environment 300 includes a network communicator 320 and a turn manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, turn manager circuitry 330, etc.). It should be appreciated that, in such embodiments, one or more of the network communicator circuitry 320 or the turn manager circuitry 330 may form a portion of one or more of the CPU 202, the main memory 204, the I/O subsystem 206, and/or other components of the network switch 110.

In the illustrative embodiment, the environment 300 includes packet data 302, which may be embodied as any data indicative of packets (e.g., a stream of packets), including payloads and headers (e.g., source address information, destination address information, port information, etc.) received by the network switch 110 (e.g., from one or more of the compute devices 152, 154, 156, 158, 160), communicated between the arbiter units 140, and transmitted out of the network switch 110 (e.g., to the compute device 164). Additionally, in the illustrative embodiment, the environment 300 includes weight data 304 which may be embodied as any data indicative of a number of turns to be provided to each input port 170 of each arbiter unit 140 to transfer packets therefrom. As described in more detail herein, the weight data 304 is indicative of the number of different devices (e.g., compute devices 150) whose packets are communicated to a particular input port 170. The network switch 110, in the illustrative embodiment, assigns weight data 304 to each input port 170 of each arbiter unit 140, indicative of either the number of different devices (e.g., compute devices 150) connected to each input port 170 (e.g., one), or the number of devices connected to one or more input ports 170 of one or more arbiter units 140 providing packets to a particular input port 170 of another arbiter unit 140 (e.g., an arbiter unit 140 at a later stage in the network switch 110). As such if an arbiter unit 140 that is actively transferring packets from four compute devices 150 passes packets to one input port 170 of a subsequent arbiter unit 140, the weight associated with the input port 170 of the subsequent arbiter unit 140 is four. Additionally, in the illustrative embodiment, the environment 300 includes turn data 306, which may be embodied as a sequence of turns generated by the network switch 110 for a particular arbiter unit 140 to give to each input port 170 when transferring a stream of packets (e.g., the packet data). In the illustrative embodiment, the network switch 110 generates the turn data 306 as a function of the weight data 304. For example, if a given weight associated with a particular input port 170 is four, the network switch 110 will cause the corresponding arbiter unit 140 to assign four turns to that input port 170 (e.g., transfer four packets from the input port 170) before transferring one or more packets from the next input port 170 of the same arbiter unit 140.

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network switch 110, respectively. To do so, the network communicator 320 is configured to receive and process data packets (e.g., from a compute device 150) and to prepare and send data packets to a system or compute device (e.g., another compute device 150). Accordingly, in some embodiments, at least a portion of the functionality of the network communicator 320 may be performed by the communication circuitry 208, and, in the illustrative embodiment, by the port logic(s) 210.

The turn manager 330, which may be embodied as hardware, firmware, software, virtualized hardware, emulated architecture, and/or a combination thereof as discussed above, is configured to assist the network communicator 320 by determining a sequence of turns for the arbiter units 140 to give to each of the input ports 170 to provide a balanced distribution of throughput for devices (e.g., the compute devices 150) connected to the network switch 110, regardless of whether the devices are unevenly distributed across the arbiter units 140 in the stage 130. To do so, in the illustrative embodiment, the turn manager 330 includes a weight determiner 332 and a sequence determiner 334. The weight determiner 332, in the illustrative embodiment, is configured to determine the number of devices (e.g., compute devices 150) associated with each input port 170 of each arbiter unit 140 and generate a weight indicative (e.g., equal to) that number. In the illustrative embodiment, for an arbiter unit 140 in the stage 130 (e.g., an input stage) of the network switch 110, the weight determiner 332 may detect whether a device is physically connected to the corresponding input port 170 (e.g., by detecting a voltage change or electrical current indicative of a physical connection of a conductor to the input port 170) and/or is otherwise in communication with the input port 170, such as by detecting a packet wirelessly transmitted from a device to the input port 170 (e.g., by detecting an identifier of the port in a header of the packet). The weight determiner 332 is also configured to determine the weight for each input port 170 of an arbiter unit 140 (e.g., the arbiter unit 146) in a subsequent stage (e.g., the stage 132) as the total weight of the input ports 170 of the corresponding upstream arbiter unit 140 (e.g., the arbiter unit 142) from the previous stage (e.g., the stage 130). As such, if the arbiter unit 142 has a compute device 150 connected to each of the input ports 170, then the weight of each input port 170 of the arbiter unit 142 is one and the weight of the corresponding input port 170 of the arbiter unit 146 is four. The sequence determiner 334, in the illustrative embodiment, is configured to determine, as a function of the weight data 304, a sequence of turns (e.g., the turn data 306) in which each arbiter unit 140 is to transfer packets from its input ports 170. In the illustrative embodiment, the sequence determiner 334 determines a round-robin sequence in which a given arbiter unit 140 provides a number of consecutive turns equal to the weight assigned to the corresponding input port 170 before advancing to the next input port 170, if any. In the illustrative embodiment, when all of the turns for all of the input ports 170 of an arbiter unit 140 have been used, the sequence repeats.

It should be appreciated that each of the class of weight determiner 332 and the sequence determiner 334 may be separately embodied as hardware, firmware, software, virtualized hardware, emulated architecture, and/or a combination thereof. For example, the weight determiner 332 may be embodied as a hardware component, while the sequence determiner 334 is embodied as a virtualized hardware component or as some other combination of hardware, firmware, software, virtualized hardware, emulated architecture, and/or a combination thereof.

Figure 4:
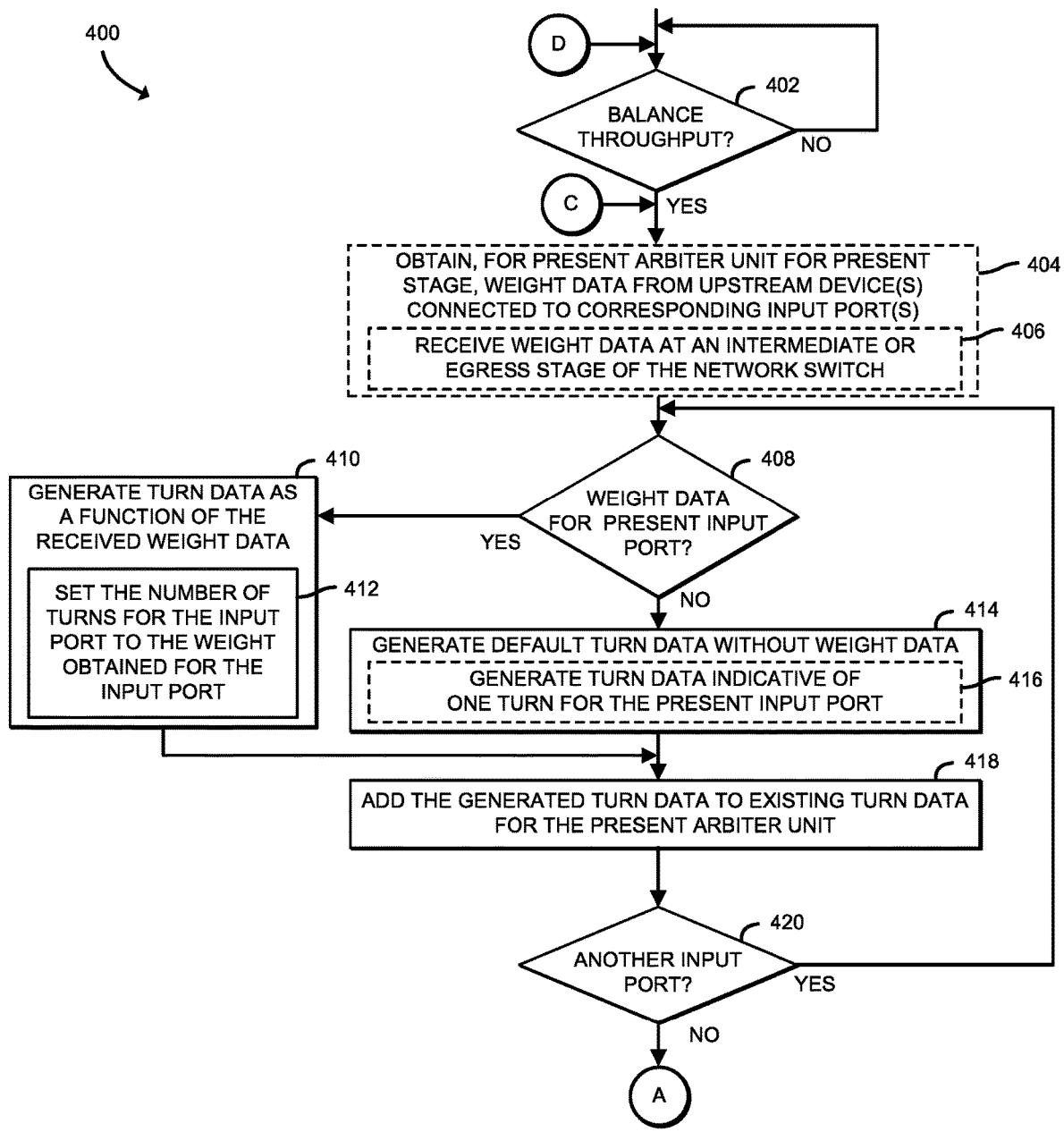
FIGS. 4-6 are a simplified block diagram of at least one embodiment of a method for balancing throughput across input ports that may be performed by the network switch of FIGS. 1 and 2.

Referring now to FIG. 4, in use, the network switch 110 may execute a method 400 for balancing throughput across input ports (e.g., the input ports 170). The method 400 begins with block 402, in which the network switch 110 determines whether to balance throughput for devices (e.g., the compute devices 150) connected to the input ports 170. In doing so, the network switch 110 may determine whether a request to balance throughput has been received from an external source (e.g., from an administrator compute device) or whether an indicator to balance throughput is present in a configuration file (e.g., in the storage device 312) or from another source. In other embodiments, the network switch 110 may make the determination based on other factors. Regardless, in response to a determination to balance throughput, the method 400 advances to block 404, in which the network switch 110 obtains, at a present arbiter unit 140 at a present stage 130, 132, weight data 304 from one or more upstream devices (e.g., upstream arbiter unit(s) 140) connected to one or more input ports 170 of the present arbiter unit 140. In doing so, in the illustrative embodiment and as indicated in block 406, the network switch 110 receives the weight data 304 at an arbiter unit 140 in an intermediate or egress stage (e.g., a stage subsequent to the stage 130, in which the input ports 170 are not directly connected to devices outside of the of the network switch 110). There are multiple ways to transfer weight data to a downstream arbiter. One way is to maintain a running average of the weight on a per input basis. Another way is to obtain a snapshot of the weight at a given moment in time.

In block 408, the network switch 110 determines, for one input port 170 of the present arbiter unit 140, whether weight data 304 has been obtained. If so, the method 400 advances to block 410 in which the network switch 110 generates turn data 306 as a function of the obtained weight data 304. In doing so, the network switch 110 sets the number of turns for the input port 170 to the weight obtained for the input port 170, as indicated in block 412. Alternatively, if the network switch 110 did not obtain weight data 304 for the present input port 170, the method 400 advances to block 414 in which the network switch 110 generates default turn data without weight data 304. In doing so, and as indicated in block 416, the network switch 110 may generate turn data 306 indicative of one turn for the present input port 170 (e.g., if the network switch 110 determines that a device is connected to the input port 170, as described above). Subsequently, the method 400 advances to block 418 in which the network switch 110 adds the generated turn data 306 to any previously existing turn data 306 for the present arbiter unit 140. Afterwards, the method 400 advances to block 420 in which the network switch 110 determines whether the present arbiter unit 140 includes another input port 170 for which weight 304 data may have been obtained in block 404. In response to a determination that the arbiter unit 140 includes another input port 170, the method 400 loops back to block 408, in which the network switch 110 determines whether weight data 304 was obtained (e.g., in block 404) for the next input port 170 and repeats the operations described above to add additional turn data 306 (e.g., for the present input port 170) to the existing turn data 306. Referring back to block 420, in response to a determination that no other input ports 170 are present in the arbiter unit 140, the method 400 advances to block 422 of FIG. 5, in which the network switch 110 sequentially transfers packet data 302 from one or more upstream devices (e.g., compute devices 150) coupled to the input port(s) 170 of the present arbiter unit 140.

Figure 5:
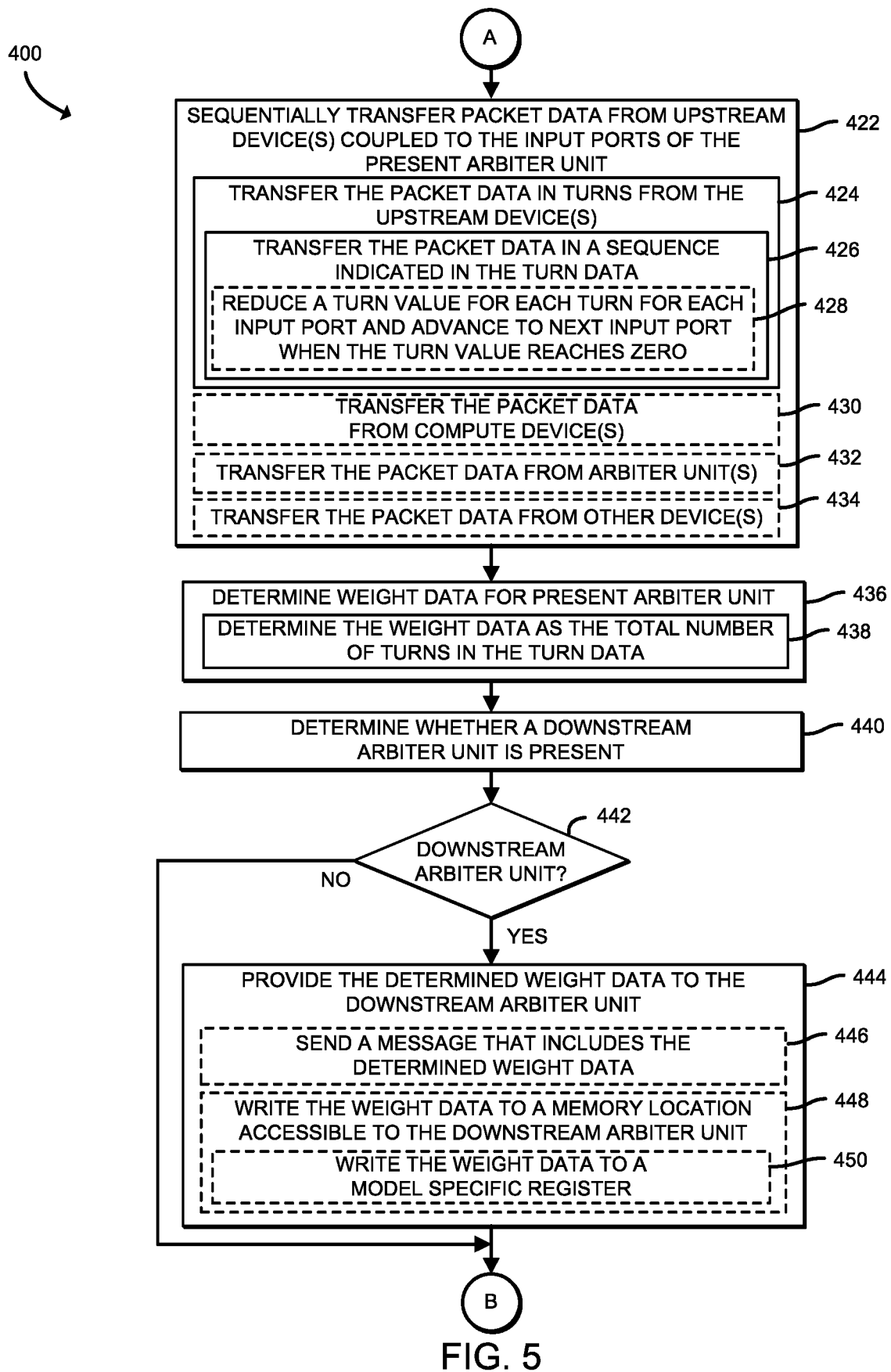

Referring now to FIG. 5, in sequentially transferring the packet data 302, the network switch 110 transfers the packet data 302 in turns from one or more upstream devices, as indicated in block 424. For example, if the present arbiter unit 140 is in the stage 130, then the network switch 110 may transfer packet data from one or more compute devices 150 connected to the input ports 170 of the arbiter unit 140. Otherwise, if the present arbiter unit 140 is in a subsequent stage (e.g., arbiter unit 146 in the stage 132), the network switch 110 transfers, at the arbiter unit 146, the packet data from upstream arbiter units 140 (e.g., from the arbiter units 142, 144 in the stage 130). In the illustrative embodiment, and as indicated in block 426, in transferring the packet data 302 in turns, the network switch 110 transfers the packet data 302 in the sequence indicated in the turn data 306 generated in blocks 408 through 418 described with reference to FIG. 4. As indicated in block 428, in transferring the packet data in the sequence, the network switch 110 may reduce a turn value, which is initially set to the weight for the input port 170, for each turn that is used, and advance to the next input port 170 when the turn value of the present input port 170 reaches zero. As indicated in block 430, in transferring the packet data 302, the network switch 110 may transfer packet data 302 from one or more compute devices 150. Additionally or alternatively, the network switch 110 may transfer packet data 302 from one or more upstream arbiter units 140, as indicated in block 432 and/or from one or more other devices, as indicated in block 434.

Subsequently, the method 400 advances to block 436 in which the network switch 110 determines weight data 304 for the present arbiter unit 140. In doing so, in the illustrative embodiment, the network switch 110 determines the weight data as the total number of turns in the turn data 306 (e.g., the number of turns taken to transfer packets from the input port(s) 170 of the present arbiter unit 140 before the sequence repeats), as indicated in block 438. Afterwards, in block 440, the network switch 110 determines whether a downstream arbiter unit 140 is present (e.g., whether a subsequent stage, such as stage 132, is present in the network switch 110). In block 442, the network switch 110 determines the subsequent course of action as a function of whether a downstream arbiter unit 140 is present. In response to a determination that a downstream arbiter unit 140 is present, the network switch 110 provides the determined weight data 304 from block 436 to the downstream arbiter unit 140, as indicated in block 444. In doing so, the network switch 110 may send a message (e.g., from the present arbiter unit 140 to the downstream arbiter unit 140) that includes the determined weight data 304, as indicated in block 446. Additionally or alternatively, the network switch 110 may write the determined weight data 304 to a memory location that is accessible to the downstream arbiter unit 140, as indicated in block 448. In doing so, the network switch 110 may write the weight data to a model specific register to be read by the downstream arbiter unit 140, as indicated in block 450.

Figure 6:
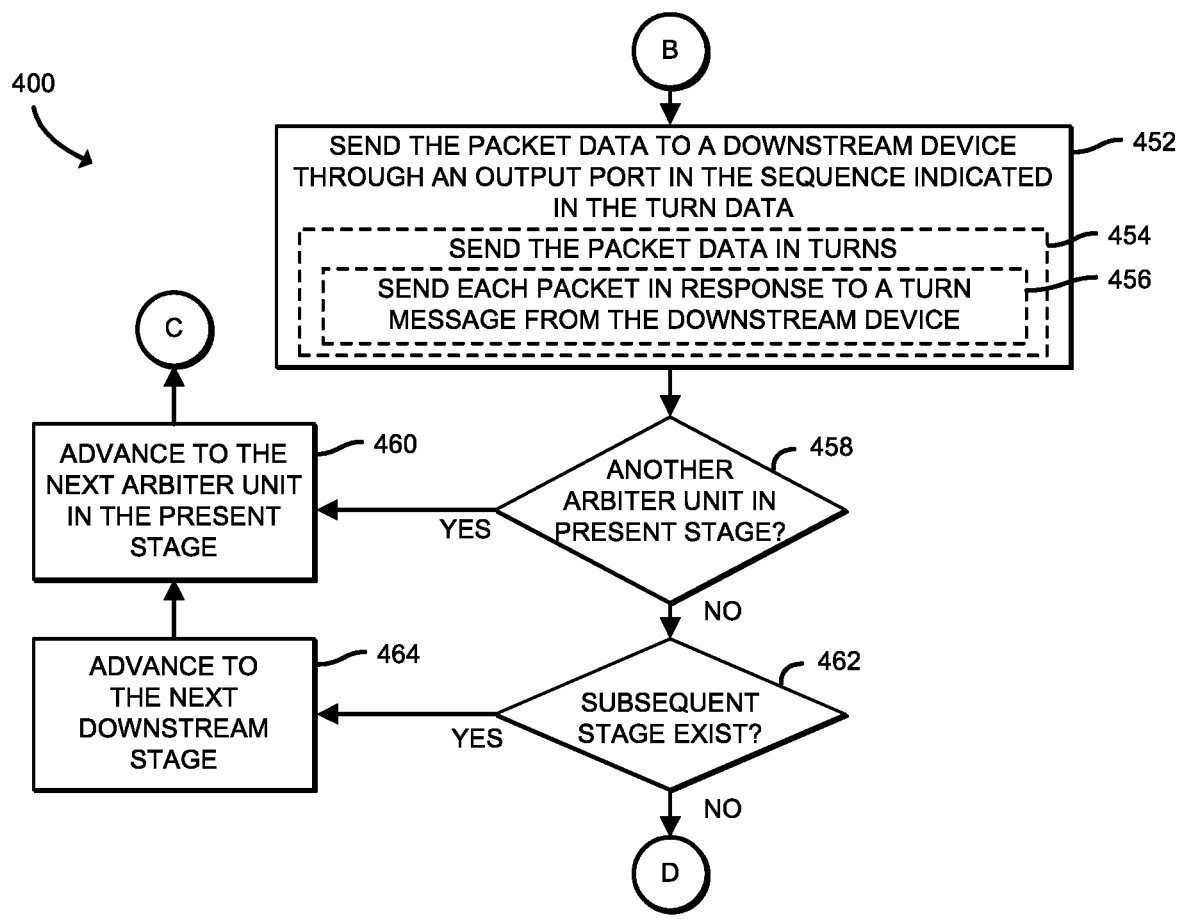

Afterwards, or if the network switch 110 determined that there is no downstream arbiter unit 140 from the present arbiter unit 140 (e.g., the present arbiter unit 140 is in the last stage 132), the method 400 advances to block 452 of FIG. 6, in which the network switch 110 sends the received packet data 302 from the present arbiter unit 140 to a downstream device (e.g., a downstream arbiter unit 140 or a compute device 150, such as the compute device 164) through an output port 180 in the sequence indicated in the turn data 306. In doing so, the network switch 110 may send the packet data 302 in turns, as indicated in block 454. Further, and as indicated in block 456, the network switch 110 may cause the present arbiter unit 140 to send each packet in the packet data in response to a corresponding turn message (e.g., a request for the next packet) from the downstream device.

In block 458, the method 400 proceeds along one of multiple paths based on whether another arbiter unit 140 is in the present stage. If not, the method 400 advances to block 462 in which the method 400 is to proceed along one of multiple paths based on whether a subsequent (e.g., downstream) stage exists in the network switch 110. If so, the method 400 advance to block 464 in which the subsequent stage becomes the present stage. Subsequently, or if the determination in block 458 is that another arbiter unit 140 exists in the present stage, the next arbiter unit 140 in the present stage becomes the present arbiter unit 140. After advancing to the next arbiter unit 140 and/or the next stage, the method 400 loops back to block 404 of FIG. 4 to obtain weight data 304 for the present arbiter unit 140. Otherwise, and referring back to block 462 of FIG. 6, if no subsequent stage exists, the method 400 loops back to block 402 in which the network switch 110 again determines whether to balance throughput. While the method 400 is described above as performing operations for one arbiter unit 140 and then performing similar operations for another arbiter unit 140 either in the same stage or in a subsequent stage (e.g., downstream stage) to explain the flow of packets through the network switch 110, it should be understood that, in the illustrative embodiment, the arbiter units 140 operate concurrently with each other, rather than one at a time.

Figure 7:
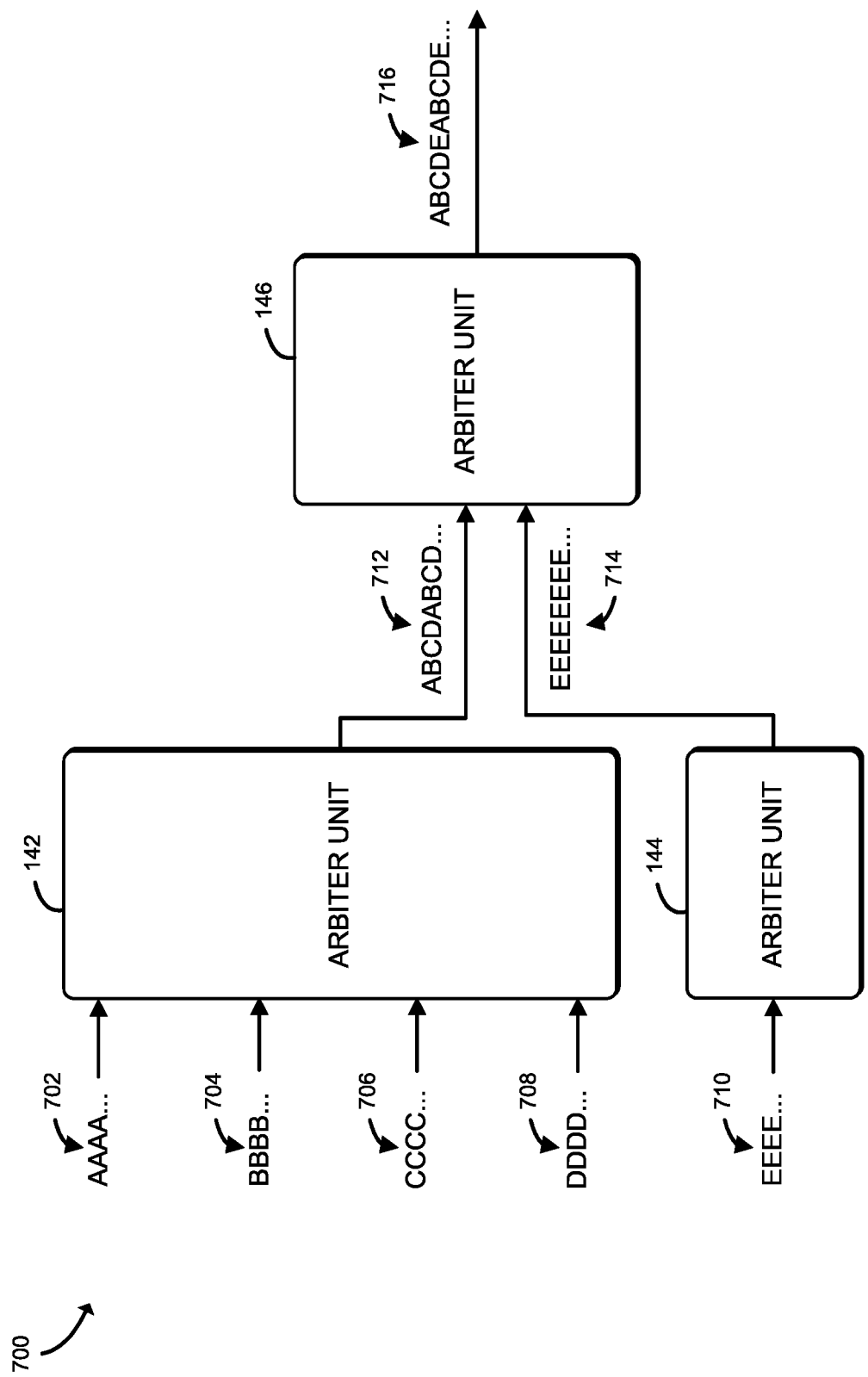
FIG. 7 is a simplified block diagram of at least one embodiment of a flow of packets through the network switch of FIGS. 1 and 2.

Referring now to FIG. 7, a flow 700 of packets passes through the network switch 110 when the network switch 110 is performing the method 400 to balance throughput across the input ports 170. As indicated in FIG. 7, the arbiter unit 142 receives an input stream 702 of packets in which each packet is represented as an "A". Additionally, the arbiter unit 142 receives another input stream 704 of packets in which each packet is represented as a "B". The arbiter unit 142 also receives an input stream 706 of packets in which each packet is represented as a "C", and another input stream 706 of packets in which each packet is represented as a "D". The arbitrator unit 142 receives each input stream 702, 704, 706, 708 through a corresponding input port 170 from a corresponding compute device 150 (e.g., compute devices 152, 154, 156, 158). Additionally, the arbiter unit 144 receives an input stream 710 of packets in which each packet is represented as an "E".

The arbiter unit 142 sends an output stream 712 of packets to the arbiter unit 146. In the output stream 712, a packet from each input stream 702, 704, 706, 708 has received a corresponding turn in the repeating sequence "ABCD". Likewise, the arbiter unit 144 sends an output stream 714 of "E" packets to the arbiter unit 146, corresponding to the input stream 710. The arbiter unit 146, in response, sends an output stream 716 of packets in which each of the input streams 702, 704, 706, 708, 710 is fairly represented (e.g., one packet from each input stream is included in the repeating sequence), rather than apportioning half of the output stream 716 to stream 712 and the other half to stream 714.

EXAMPLES

Illustrative examples of the technologies disclosed herein are provided below. An embodiment of the technologies may include any one or more, and any combination of, the examples described below.

Example 1 includes a network switch for balancing throughput across input ports, the network switch comprising a plurality of arbiter units configured in a hierarchy of stages, wherein each arbiter unit includes one or more input ports and an output port; circuitry to generate, for an arbiter unit in a first stage of the hierarchy, turn data indicative of a set of turns in which to transfer packet data from one or more devices connected to the one or more of the input ports of the arbiter unit to a subsequent stage; transfer, with the arbiter unit, the packet data from the one or more devices in the set of turns to the subsequent stage; determine weight data indicative of the number of turns represented in the set, wherein each turn corresponds to a packet transferred from a different device; and provide the weight data from the arbiter unit in the first stage to another arbiter unit in the subsequent stage of the hierarchy to cause the arbiter unit in the subsequent stage to allocate the number of turns indicated in the weight data for the transfer of the packet data from the arbiter unit in the first stage to a downstream device.

Example 2 includes the subject matter of Example 1, and wherein to generate the turn data comprises to receive weight data from one or more of the devices; and add a number of turns represented in the received weight data to the turn data.

Example 3 includes the subject matter of any of Examples 1 and 2, and wherein to generate the turn data comprises to determine whether one or more of the devices did not provide weight data to the arbiter unit in the first stage; and generate, in response to a determination that one or more of the devices did not provide weight data to the arbiter unit in the first stage, turn data indicative of one turn for each device that did not provide weight data.

Example 4 includes the subject matter of any of Examples 1-3, and wherein to transfer the packet data from the one or more devices in the set of turns comprises to reduce a turn value associated with an input port for each packet received through the input port; determine whether the turn value associated with the input port is equal to zero; and advance, in response to a determination that the turn value associated with the input port is equal to zero, to a second input port of the arbiter unit to transfer one or more packets through the second input port.

Example 5 includes the subject matter of any of Examples 1-4, and wherein to transfer the packet data from the one or more devices comprises to transfer packet data from one or more compute devices.

Example 6 includes the subject matter of any of Examples 1-5, and wherein to transfer the packet data from the one or more devices comprises to transfer packet data from one or more other arbiter units.

Example 7 includes the subject matter of any of Examples 1-6, and wherein to provide the weight data from the arbiter unit to another arbiter unit comprises to send a message to the other arbiter unit that includes the weight data.

Example 8 includes the subject matter of any of Examples 1-7, and wherein to provide the weight data from the arbiter unit to another arbiter unit comprises to write the weight data to a memory location that is accessible to the other arbiter unit.

Example 9 includes the subject matter of any of Examples 1-8, and wherein to provide the weight data from the arbiter unit to another arbiter unit comprises to write the weight data to a model specific register associated with the other arbiter unit.

Example 10 includes the subject matter of any of Examples 1-9, and wherein the circuitry is further to generate, for a second arbiter unit in the first stage of the hierarchy, turn data indicative of a set of turns in which to transfer packet data from one or more devices connected to one or more of the input ports of the second arbiter unit; transfer, with the second arbiter unit, the packet data from the one or more devices in the set of turns; determine weight data indicative of the number of turns represented in the set, wherein each turn corresponds to a packet received from a different device; and provide the weight data from the second arbiter unit in the first stage to the arbiter unit in the subsequent stage of the hierarchy to cause the arbiter unit in the subsequent stage of the hierarchy to allocate an equal number of turns for the transfer of the packet data from the second arbiter unit in the first stage.

Example 11 includes the subject matter of any of Examples 1-10, and wherein the circuitry is further to transmit, with the arbiter unit in the subsequent stage of the hierarchy, the packet data to a device coupled to the output port of the arbiter unit in the subsequent stage.

Example 12 includes the subject matter of any of Examples 1-11, and wherein to determine the weight data comprises to dynamically determine a running average of a weight on a per input port basis.

Example 13 includes the subject matter of any of Examples 1-12, and wherein to determine the weight data comprises to obtain a snapshot of a weight associated with each input port.

Example 14 includes a method for balancing throughput across input ports of a network switch, the method comprising generating, by a network switch for an arbiter unit in a first stage of a hierarchy of stages of arbiter units, turn data indicative of a set of turns in which to transfer packet data from one or more devices connected to one or more input ports of the arbiter unit to a subsequent stage; transferring, by the network switch and with the arbiter unit, the packet data from the one or more devices in the set of turns to the subsequent stage; transferring, by the network switch, weight data indicative of the number of turns represented in the set, wherein each turn corresponds to a packet transferred from a different device; and providing, by the network switch, the weight data from the arbiter unit in the first stage to another arbiter unit in a subsequent stage of the hierarchy to cause the arbiter unit in the subsequent stage to allocate the number of turns indicated in the weight data for the transfer of the packet data from the arbiter unit in the first stage to a downstream device.

Example 15 includes the subject matter of Example 14, and wherein generating the turn data comprises receiving weight data from one or more of the devices; and adding a number of turns represented in the received weight data to the turn data.

Example 16 includes the subject matter of any of Examples 14 and 15, and wherein generate the turn data comprises determining whether one or more of the devices did not provide weight data to the arbiter unit in the first stage; and generating, in response to a determination that one or more of the devices did not provide weight data to the arbiter unit in the first stage, turn data indicative of one turn for each device that did not provide weight data.

Example 17 includes the subject matter of any of Examples 14-16, and wherein transferring the packet data from the one or more devices in the set of turns comprises reducing a turn value associated with an input port for each packet transferred through the input port; determining whether the turn value associated with the input port is equal to zero; and advancing, in response to a determination that the turn value associated with the input port is equal to zero, to a second input port of the arbiter unit to transfer one or more packets through the second input port.

Example 18 includes the subject matter of any of Examples 14-17, and wherein transferring the packet data from the one or more devices comprises transferring packet data from one or more compute devices.

Example 19 includes the subject matter of any of Examples 14-18, and wherein transferring the packet data from the one or more devices comprises transferring packet data from one or more other arbiter units.

Example 20 includes the subject matter of any of Examples 14-19, and wherein providing the weight data from the arbiter unit to another arbiter unit comprises to send a message to the other arbiter unit that includes the weight data.

Example 21 includes the subject matter of any of Examples 14-20, and wherein providing the weight data from the arbiter unit to another arbiter unit comprises to write the weight data to a memory location that is accessible to the other arbiter unit.

Example 22 includes the subject matter of any of Examples 14-21, and wherein providing the weight data from the arbiter unit to another arbiter unit comprises to write the weight data to a model specific register associated with the other arbiter unit.

Example 23 includes the subject matter of any of Examples 14-22, and further including generating, by the network switch for a second arbiter unit in the first stage of the hierarchy, turn data indicative of a set of turns in which to transfer packet data from one or more devices connected to one or more of the input ports of the second arbiter unit; transferring, by the network switch with the second arbiter unit, the packet data from the one or more devices in the set of turns; determining, by the network switch, weight data indicative of the number of turns represented in the set, wherein each turn corresponds to a packet transferred from a different device; and providing, by the network switch, the weight data from the second arbiter unit in the first stage to the arbiter unit in the subsequent stage of the hierarchy to cause the arbiter unit in the subsequent stage of the hierarchy to allocate an equal number of turns for the receipt of the packet data from the second arbiter unit in the first stage.

Example 24 includes the subject matter of any of Examples 14-23, and further including transmitting, with the arbiter unit in the subsequent stage of the hierarchy, the packet data to a device coupled to the output port of the arbiter unit in the subsequent stage.

Example 25 includes the subject matter of any of Examples 14-24, and wherein determining the weight data comprises dynamically determining a running average of a weight on a per input port basis.

Example 26 includes the subject matter of any of Examples 14-25, and wherein determining the weight data comprises obtaining a snapshot of a weight associated with each input port.

Example 27 includes one or more machine-readable storage media comprising a plurality of instructions stored thereon that, in response to being executed, cause a network switch to perform the method of any of Examples 14-26.

Example 28 includes a network switch to manage quality of service of a platform interconnect, the network switch comprising one or more processors; one or more memory devices having stored therein a plurality of instructions that, when executed by the one or more processors, cause the network switch to perform the method of any of Examples 14-26.

Example 29 includes a network switch comprising means for performing the method of any of Examples 14-26.

Example 30 includes a network switch for balancing throughput across input ports, the network switch comprising a plurality of arbiter units configured in a hierarchy of stages, wherein each arbiter unit includes one or more input ports and an output port; turn manager circuitry to generate, for an arbiter unit in a first stage of the hierarchy, turn data indicative of a set of turns in which to transfer packet data from one or more devices connected to the one or more of the input ports of the arbiter unit to a subsequent stage; transfer, with the arbiter unit, the packet data from the one or more devices in the set of turns to the subsequent stage; determine weight data indicative of the number of turns represented in the set, wherein each turn corresponds to a packet transferred from a different device; and provide the weight data from the arbiter unit in the first stage to another arbiter unit in a subsequent stage of the hierarchy to cause the arbiter unit in the subsequent stage to allocate the number of turns indicated in the weight data for the transfer of the packet data from the arbiter unit in the first stage to a downstream device.

Example 31 includes the subject matter of Example 30, and wherein to generate the turn data comprises to receive weight data from one or more of the devices; and add a number of turns represented in the received weight data to the turn data.

Example 32 includes the subject matter of any of Examples 30 and 31, and wherein to generate the turn data comprises to determine whether one or more of the devices did not provide weight data to the arbiter unit in the first stage; and generate, in response to a determination that one or more of the devices did not provide weight data to the arbiter unit in the first stage, turn data indicative of one turn for each device that did not provide weight data.

Example 33 includes the subject matter of any of Examples 30-32, and wherein to transfer the packet data from the one or more devices in the set of turns comprises to reduce a turn value associated with an input port for each packet received through the input port; determine whether the turn value associated with the input port is equal to zero; and advance, in response to a determination that the turn value associated with the input port is equal to zero, to a second input port of the arbiter unit to transfer one or more packets through the second input port.

Example 34 includes the subject matter of any of Examples 30-33, and wherein to transfer the packet data from the one or more devices comprises to transfer packet data from one or more compute devices.

Example 35 includes the subject matter of any of Examples 30-34, and wherein to transfer the packet data from the one or more devices comprises to transfer packet data from one or more other arbiter units.

Example 36 includes the subject matter of any of Examples 30-35, and wherein to provide the weight data from the arbiter unit to another arbiter unit comprises to send a message to the other arbiter unit that includes the weight data.

Example 37 includes the subject matter of any of Examples 30-36, and wherein to provide the weight data from the arbiter unit to another arbiter unit comprises to write the weight data to a memory location that is accessible to the other arbiter unit.

Example 38 includes the subject matter of any of Examples 30-37, and wherein to provide the weight data from the arbiter unit to another arbiter unit comprises to write the weight data to a model specific register associated with the other arbiter unit.

Example 39 includes the subject matter of any of Examples 30-38, and wherein the turn manager circuitry is further to generate, for a second arbiter unit in the first stage of the hierarchy, turn data indicative of a set of turns in which to transfer packet data from one or more devices connected to one or more of the input ports of the second arbiter unit; transfer, with the second arbiter unit, the packet data from the one or more devices in the set of turns; determine weight data indicative of the number of turns represented in the set, wherein each turn corresponds to a packet received from a different device; and provide the weight data from the second arbiter unit in the first stage to the arbiter unit in the subsequent stage of the hierarchy to cause the arbiter unit in the subsequent stage of the hierarchy to allocate an equal number of turns for the transfer of the packet data from the second arbiter unit in the first stage.

Example 40 includes the subject matter of any of Examples 30-39, and wherein the turn manager circuitry is further to transmit, with the arbiter unit in the subsequent stage of the hierarchy, the packet data to a device coupled to the output port of the arbiter unit in the subsequent stage.

Example 41 includes the subject matter of any of Examples 30-40, and wherein to determine the weight data comprises to dynamically determine a running average of a weight on a per input port basis.

Example 42 includes the subject matter of any of Examples 30-41, and wherein to determine the weight data comprises to obtain a snapshot of a weight associated with each input port.

Example 43 includes a network switch comprising means for generating, for an arbiter unit in a first stage of a hierarchy of stages of arbiter units, turn data indicative of a set of turns in which to transfer packet data from one or more devices connected to one or more input ports of the arbiter unit to a subsequent stage; circuitry for transferring, with the arbiter unit, the packet data from the one or more devices in the set of turns to the subsequent stage; circuitry for transferring weight data indicative of the number of turns represented in the set, wherein each turn corresponds to a packet transferred from a different device; and circuitry for providing the weight data from the arbiter unit in the first stage to another arbiter unit in a subsequent stage of the hierarchy to cause the arbiter unit in the subsequent stage to allocate the number of turns indicated in the weight data for the transfer of the packet data from the arbiter unit in the first stage to a downstream device.

Example 44 includes the subject matter of Example 43, and wherein the means for generating the turn data comprises means for receiving weight data from one or more of the devices; and means for adding a number of turns represented in the received weight data to the turn data.

Example 45 includes the subject matter of any of Examples 43 and 44, and wherein the means for generate the turn data comprises means for determining whether one or more of the devices did not provide weight data to the arbiter unit in the first stage; and means for generating, in response to a determination that one or more of the devices did not provide weight data to the arbiter unit in the first stage, turn data indicative of one turn for each device that did not provide weight data.

Example 46 includes the subject matter of any of Examples 43-45, and wherein the circuitry for transferring the packet data from the one or more devices in the set of turns comprises circuitry for reducing a turn value associated with an input port for each packet transferred through the input port; circuitry for determining whether the turn value associated with the input port is equal to zero; and circuitry for advancing, in response to a determination that the turn value associated with the input port is equal to zero, to a second input port of the arbiter unit to transfer one or more packets through the second input port.

Example 47 includes the subject matter of any of Examples 43-46, and wherein the circuitry for transferring the packet data from the one or more devices comprises circuitry for transferring packet data from one or more compute devices.

Example 48 includes the subject matter of any of Examples 43-47, and wherein the circuitry for transferring the packet data from the one or more devices comprises transferring packet data from one or more other arbiter units.

Example 49 includes the subject matter of any of Examples 43-48, and wherein the circuitry for providing the weight data from the arbiter unit to another arbiter unit comprises circuitry for sending a message to the other arbiter unit that includes the weight data.

Example 50 includes the subject matter of any of Examples 43-49, and wherein the circuitry for providing the weight data from the arbiter unit to another arbiter unit comprises circuitry for writing the weight data to a memory location that is accessible to the other arbiter unit.

Example 51 includes the subject matter of any of Examples 43-50, and wherein the circuitry for providing the weight data from the arbiter unit to another arbiter unit comprises circuitry for writing the weight data to a model specific register associated with the other arbiter unit.

Example 52 includes the subject matter of any of Examples 43-51, and further including means for generating, for a second arbiter unit in the first stage of the hierarchy, turn data indicative of a set of turns in which to transfer packet data from one or more devices connected to one or more of the input ports of the second arbiter unit; circuitry for transferring, with the second arbiter unit, the packet data from the one or more devices in the set of turns; circuitry for determining weight data indicative of the number of turns represented in the set, wherein each turn corresponds to a packet transferred from a different device; and circuitry for providing the weight data from the second arbiter unit in the first stage to the arbiter unit in the subsequent stage of the hierarchy to cause the arbiter unit in the subsequent stage of the hierarchy to allocate an equal number of turns for the receipt of the packet data from the second arbiter unit in the first stage.

Example 53 includes the subject matter of any of Examples 43-52, and further including circuitry for transmitting, with the arbiter unit in the subsequent stage of the hierarchy, the packet data to a device coupled to the output port of the arbiter unit in the subsequent stage.

Example 54 includes the subject matter of any of Examples 43-53, and wherein the circuitry for determining the weight data comprises circuitry for dynamically determining a running average of a weight on a per input port basis.

Example 55 includes the subject matter of any of Examples 43-54, and wherein the circuitry for determining the weight data comprises circuitry for obtaining a snapshot of a weight associated with each input port.

The invention claimed is:

1. A network switch for balancing throughput across input ports, the network switch comprising:
    a plurality of arbiter units configured in a hierarchy of stages, wherein each arbiter unit includes one or more input ports and an output port;
    circuitry to:
        generate, for an arbiter unit in a first stage of the hierarchy, turn data indicative of a set of turns in which to transfer packet data from one or more devices connected to the one or more of the input ports of the arbiter unit to a subsequent stage;
        transfer, with the arbiter unit, the packet data from the one or more devices in the set of turns to the subsequent stage;
        determine weight data indicative of a number of turns represented in the set, wherein each turn corresponds to a packet transferred from a different device; and
        provide the weight data from the arbiter unit in the first stage to another arbiter unit in the subsequent stage of the hierarchy to cause the arbiter unit in the subsequent stage to allocate the number of turns indicated in the weight data for the transfer of the packet data from the arbiter unit in the first stage to a downstream device.

2. The network switch of claim 1, wherein to generate the turn data comprises to:
    receive weight data from one or more of the devices; and
    add a number of turns represented in the received weight data to the turn data.

3. The network switch of claim 1, wherein to generate the turn data comprises to:
    determine whether one or more of the devices did not provide weight data to the arbiter unit in the first stage; and
    generate, in response to a determination that one or more of the devices did not provide weight data to the arbiter unit in the first stage, turn data indicative of one turn for each device that did not provide weight data.

4. The network switch of claim 1, wherein to transfer the packet data from the one or more devices in the set of turns comprises to:
    reduce a turn value associated with an input port for each packet received through the input port;
    determine whether the turn value associated with the input port is equal to zero; and
    advance, in response to a determination that the turn value associated with the input port is equal to zero, to a second input port of the arbiter unit to transfer one or more packets through the second input port.

5. The network switch of claim 1, wherein to transfer the packet data from the one or more devices comprises to transfer packet data from one or more compute devices.

6. The network switch of claim 1, wherein to transfer the packet data from the one or more devices comprises to transfer packet data from one or more other arbiter units.

7. The network switch of claim 1, wherein to provide the weight data from the arbiter unit to another arbiter unit comprises to send a message to the other arbiter unit that includes the weight data.

8. The network switch of claim 1, wherein to provide the weight data from the arbiter unit to another arbiter unit comprises to write the weight data to a memory location that is accessible to the other arbiter unit.

9. The network switch of claim 1, wherein to provide the weight data from the arbiter unit to another arbiter unit comprises to write the weight data to a model specific register associated with the other arbiter unit.

10. The network switch of claim 1, wherein the circuitry is further to:
generate, for a second arbiter unit in the first stage of the hierarchy, turn data indicative of a set of turns in which to transfer packet data from one or more devices connected to one or more of the input ports of the second arbiter unit;
transfer, with the second arbiter unit, the packet data from the one or more devices in the set of turns;
determine weight data indicative of the number of turns represented in the set, wherein each turn corresponds to a packet received from a different device; and
provide the weight data from the second arbiter unit in the first stage to the arbiter unit in the subsequent stage of the hierarchy to cause the arbiter unit in the subsequent stage of the hierarchy to allocate an equal number of turns for the transfer of the packet data from the second arbiter unit in the first stage.

11. The network switch of claim 1, wherein the circuitry is further to transmit, with the arbiter unit in the subsequent stage of the hierarchy, the packet data to a device coupled to the output port of the arbiter unit in the subsequent stage.

12. The network switch of claim 1, wherein to determine the weight data comprises to dynamically determine a running average of a weight on a per input port basis.

13. One or more non-transitory machine-readable storage media comprising a plurality of instructions stored thereon that, in response to being executed, cause a network switch to:
generate, for an arbiter unit in a first stage of a hierarchy, turn data indicative of a set of turns in which to transfer packet data from one or more devices connected to one or more input ports of the arbiter unit to a subsequent stage;
transfer, with the arbiter unit, the packet data from the one or more devices in the set of turns to the subsequent stage;
determine weight data indicative of a number of turns represented in the set, wherein each turn corresponds to a packet transferred from a different device; and
provide the weight data from the arbiter unit in the first stage to another arbiter unit in a subsequent stage of the hierarchy to cause the arbiter unit in the subsequent stage to allocate the number of turns indicated in the weight data for the transfer of the packet data from the arbiter unit in the first stage to a downstream device.

14. The one or more non-transitory machine-readable storage media of claim 13, wherein to generate the turn data comprises to:
receive weight data from one or more of the devices; and
add a number of turns represented in the received weight data to the turn data.

15. The one or more non-transitory machine-readable storage media of claim 13, wherein to generate the turn data comprises to:
determine whether one or more of the devices did not provide weight data to the arbiter unit in the first stage; and
generate, in response to a determination that one or more of the devices did not provide weight data to the arbiter unit in the first stage, turn data indicative of one turn for each device that did not provide weight data.

16. The one or more non-transitory machine-readable storage media of claim 13, wherein to transfer the packet data from the one or more devices in the set of turns comprises to:
reduce a turn value associated with an input port for each packet received through the input port;
determine whether the turn value associated with the input port is equal to zero; and
advance, in response to a determination that the turn value associated with the input port is equal to zero, to a second input port of the arbiter unit to transfer one or more packets through the second input port.

17. The one or more non-transitory machine-readable storage media of claim 13, wherein to transfer the packet data from the one or more devices comprises to transfer packet data from one or more compute devices.

18. The one or more non-transitory machine-readable storage media of claim 13, wherein to transfer the packet data from the one or more devices comprises to transfer packet data from one or more other arbiter units.

19. The one or more non-transitory machine-readable storage media of claim 13, wherein to provide the weight data from the arbiter unit to another arbiter unit comprises to send a message to the other arbiter unit that includes the weight data.

20. The one or more non-transitory machine-readable storage media of claim 13, wherein to provide the weight data from the arbiter unit to another arbiter unit comprises to write the weight data to a memory location that is accessible to the other arbiter unit.

21. The one or more non-transitory machine-readable storage media of claim 13, wherein to provide the weight data from the arbiter unit to another arbiter unit comprises to write the weight data to a model specific register associated with the other arbiter unit.

22. The one or more non-transitory machine-readable storage media of claim 13, wherein the plurality of instructions, when executed, further cause the network switch to:
generate, for a second arbiter unit in the first stage of the hierarchy, turn data indicative of a set of turns in which to transfer packet data from one or more devices connected to one or more of the input ports of the second arbiter unit;
transfer, with the second arbiter unit, the packet data from the one or more devices in the set of turns;
determine weight data indicative of a number of turns represented in the set, wherein each turn corresponds to a packet received from a different device; and
provide the weight data from the second arbiter unit in the first stage to the arbiter unit in the subsequent stage of the hierarchy to cause the arbiter unit in the subsequent stage of the hierarchy to allocate an equal number of turns for the transfer of the packet data from the second arbiter unit in the first stage.

23. The one or more non-transitory machine-readable storage media of claim 13, wherein the plurality of instructions, when executed, further cause the network switch to transmit, with the arbiter unit in the subsequent stage of the hierarchy, the packet data to a device coupled to an output port of the arbiter unit in the subsequent stage.

24. The one or more non-transitory machine-readable storage media of claim 13, wherein to determine the weight data comprises to dynamically determine a running average of a weight on a per input port basis.

25. A network switch comprising:
 means for generating, for an arbiter unit in a first stage of a hierarchy of stages of arbiter units, turn data indicative of a set of turns in which to transfer packet data from one or more devices connected to one or more input ports of the arbiter unit to a subsequent stage;
 circuitry for transferring, with the arbiter unit, the packet data from the one or more devices in the set of turns to the subsequent stage;
 circuitry for transferring weight data indicative of a number of turns represented in the set, wherein each turn corresponds to a packet transferred from a different device; and
 circuitry for providing the weight data from the arbiter unit in the first stage to another arbiter unit in a subsequent stage of the hierarchy to cause the arbiter unit in the subsequent stage to allocate the number of turns indicated in the weight data for the transfer of the packet data from the arbiter unit in the first stage to a downstream device.

26. A method for balancing throughput across input ports of a network switch, the method comprising:
 generating, by a network switch for an arbiter unit in a first stage of a hierarchy of stages of arbiter units, turn data indicative of a set of turns in which to transfer packet data from one or more devices connected to one or more input ports of the arbiter unit to a subsequent stage;
 transferring, by the network switch and with the arbiter unit, the packet data from the one or more devices in the set of turns to the subsequent stage;
 transferring, by the network switch, weight data indicative of a number of turns represented in the set, wherein each turn corresponds to a packet transferred from a different device; and
 providing, by the network switch, the weight data from the arbiter unit in the first stage to another arbiter unit in a subsequent stage of the hierarchy to cause the arbiter unit in the subsequent stage to allocate the number of turns indicated in the weight data for the transfer of the packet data from the arbiter unit in the first stage to a downstream device.

27. The method of claim 26, wherein generating the turn data comprises:
 receiving weight data from one or more of the devices; and
 adding a number of turns represented in the received weight data to the turn data.

28. The method of claim 26, wherein generate the turn data comprises:
 determining whether one or more of the devices did not provide weight data to the arbiter unit in the first stage; and
 generating, in response to a determination that one or more of the devices did not provide weight data to the arbiter unit in the first stage, turn data indicative of one turn for each device that did not provide weight data.

* * * * *